Patented Sept. 16, 1924.

1,508,928

UNITED STATES PATENT OFFICE.

HENRY DREYFUS, OF LONDON, ENGLAND.

PLASTIC CONTAINING CELLULOSE ACETATE.

No Drawing. Original application filed August 5, 1920, Serial No. 401,380. Divided and this application filed March 13, 1923. Serial No. 624,805.

*To all whom it may concern:*

Be it known that I, HENRY DREYFUS, a citizen of the Swiss Republic, residing at London, England, have invented certain new and useful Improvements in Plastics Containing Cellulose Acetate, of which the following is a specification.

This invention relates to the manufacture of solutions, celluloid-like masses, films, dopes, artificial silk or other compositions, preparations or articles (hereinafter included in the term "compositions of matter") having a basis of cellulose acetate, and is characterized by the employment or application of certain new or improved high-boiling solvents or plasticizing agents in and for such solutions, compositions, preparations or products hereinafter and in the claiming clauses included in the term "composition of matter."

In addition to the volatile solvents or diluents, such for instance as acetone, alcohol-benzene mixtures, methyl acetate and so forth, which are generally used in making solutions or other products such as referred to, or in some cases even without such volatile solvents or diluents, it is necessary to employ solvents or plasticizing agents of higher boiling points.

These latter play an important part, and have to fulfil numerous requirements for use in the art. Besides having a high boiling point they must be liquids or jellies at ordinary temperature or even when cooled down to low temperature, this latter being especially the case for uses where the solutions, compositions or preparations are exposed to low temperatures in service, as in the case of aircraft dopes, outdoor coatings and so forth. Also the high boiling solvents must be insoluble or very little soluble in water.

In the specification of a previous U. S. Patent No. 1,353,384 filed 15th April 1919, I have described the employment as high boiling plasticizing solvents for cellulose acetate of high boiling mixtures of isomeric xylene low-carbon-alkyl sulphonamides, which mixtures are liquid at ordinary temperature, and are such as can be obtained by treating an ordinary commercial xylene containing o, m and p-xylenes, by the ordinary methods of conversion into the alkyl sulphonamides, for example by treating the crude xylene with chlorosulphonic acid to form the corresponding sulphochlorides, and then with ammonia to convert these into the sulphonamides and then methylating same to the mono or dimethyl stage or ethylating to the mono ethyl stage; or by treating the said mixed sulphochlorides with amines such as methylamine, ethylamine, etc.

In the specification of another U. S. Patent No. 1,353,385 filed 15th April 1919, I have described the employment as high boiling plasticizing solvents for cellulose acetate, of high boiling mixtures containing ortho and para toluene low-carbon-alkyl sulphonamides, which mixtures are liquid at ordinary temperature and are such as can be obtained on treating commercial toluene by the ordinary methods of conversion into the alkyl sulphonamides, for example by treating the toluene with chlorosulphonic acid to form the corresponding sulphochlorides, treating the resulting raw mixture with ammonia to convert the sulphochlorides into sulphonamides, and then methylating or ethylating to the monomethyl or monoethyl stage; or by treating the said raw mixture with amines such as methylamine, ethylamine, etc.

The present invention is characterized by the employment as plasticizing agents for the purpose mentioned, of certain high boiling toluene dialkyl sulfonamide preparations which are liquids at ordinary temperature and form jellies at temperatures considerably below ordinary room temperatures, viz:—

(a) Mixtures of o- and p-toluene dimethyl sulfonamides. Such mixtures boil at about 133°–137°C. under 1 mm. pressure, are liquid at ordinary temperature, form slightly turbid jelly at −15° C. and a firm turbid jelly at −20°C.

(b) Mixtures of o- and p-toluene methyl ethyl sulfonamides. Such mixtures boil at about 188°–189°C. under 1 mm. pressure, are liquid at ordinary temperature, form soft, clear jellies at −15°C., and firm clear jellies at −20°C.

(c) Mixtures of o- and p-toluene diethyl sulfonamides. Such mixtures boil at about 136°–142°C. under 1 mm., are liquid at ordinary temperature, form soft, clear jelly at −10°C. and a firm clear mass at −20°C.

(d) o-toluene dimethyl sulfonamide. This substance boils at about 148°–152° C. under 2 mm., is liquid at ordinary temperature, forms a soft, clear jelly at −10°C. and a firm, clear jelly at −20°C.

(e) o-toluene diethyl sulfonamide. This substance boils at about 152–155°C. under 2 mm., is liquid at ordinary temperature, forms a soft, clear jelly at −5°C., and a firm clear jelly at −20°C.

It has been found that for some applications these toluene-di-alkylated sulfonamide derivatives are not so good as the mono-alkylated sulfonamide derivatives of my said U. S. Patents No. 1,353,384 and No. 1,353,385, as their cellulose acetate solutions tend to become somewhat turbid when cooled down to or below ordinary temperature. Where this is not objectionable they may even be used alone, but they may be used together with the mono-alkylated sulfonamide derivatives of my said specifications 1,353,384 and 1,353,385 or my application S. No. 401,380 filed August 5, 1920 of which the present application is divisional, to obtain solutions which remain clear when cooled down, or together with any other suitable high boiling solvents of cellulose acetate.

For preparing the said mixtures of o and p toluene dialkyl sulfonamides, ordinary commercial toluene was used distilling between 95° and 132°C., and substantially pure toluene boiling at 110°–111°C. for the o-toluene dimethyl and o-toluene diethyl sulfonamide product.

I do not, however, confine myself to working with these particular grades of hydrocarbon. For example purer to pure toluene may be used for producing the mixtures of o- and p-toluene dialkyl sulfonamides.

The procedure followed for preparing the alkyl sulfonamide products of the present invention may be according to the ordinary methods of preparing such alkylated compounds via the sulphochlorides, these either being treated with ammonia and then alkylated with appropriate alkylating agent such as dimethyl sulphate or ethyl sulphuric acid salt or chlorethyl etc., or being treated direct with amines such as methylamine, ethylamine, etc.

It will be understood that in cases where the commercial or impure hydrocarbon is indicated above as having been used, the treatment was carried out thereon without separation or purification of the intermediate or final products, though I do not confine myself in this respect.

In the case of the o-toluene dimethyl and diethyl sulfonamides the mixture of o- and p-toluene sulfochlorides resulting from the treatment with chlorosulfonic acid was cooled in the ordinary way (at about −10° C.) and the crystallized p-sulfochloride was separated from the o-sulfochloride by filtration.

It is however to be understood that I do not limit myself to the particular procedure indicated for the preparation of the alkyl sulfonamides of the present invention and that any other methods giving substantially similar products may be employed.

The high boiling plasticizing solvents of the present invention may be employed in any suitable proportions, such for example as those indicated in my said specification No. 1,353,384.

Similarly to the alkylated sulfonamides specified in my said previous patents, the new solvents of the present invention may be employed with any usual or suitable solvents or liquids of low boiling point; likewise any other usual or suitable substances may be added, such as triphenyl phosphate, tricresylphosphate or similarly acting agents, or acid neutralizing aliphatic derivatives of urea which are liquid or have a low melting point, such as mono-, di- or tri-methyl urean or mono-, di- or tri-ethyl urea and so forth.

Also in making the solutions, compositions, or preparations with the solvents of the present invention any of the high boiling solvents of my application S. No. 401,380 or my application S. No. 624,806 divisional thereof, may be added or any other high boiling solvents or softening or plasticizing substances may be added which are liquid substances, or even solid substances, provided they give liquid, gelatinous or non-solid mixtures with the solvents of the invention.

In order to illustrate by way of example how the invention may be carried out in practice, one may use to 100 kilos of a highly viscous cellulose acetate, about 25 kilos of any of the toluene dialkyl sulfonamide derivatives of the present invention or of mixtures of two or more of them, or of any of them with alkyl sulfonamide derivatives of my said previous specifications, and about 12 kilos of tricresyl phosphate or triphenyl phosphate, these substances being mixed together with solvents of low boiling point such as acetone, methyl acetate or ethyl acetate mixed with alcohol (four volumes to one volume of alcohol), the mass being worked in the ordinary way in celluloid apparatus, first in the mixers, then on the rollers and afterwards in the presses, and so on, as generally practised in the celluloid industry. This gives quite a hard, incombustible celluloid-like product.

The quantity of about 25 kilos of the alkyl sulfonamide solvents may be reduced together with that of the triphenylphosphate or tricresylphosphate in order to get a still harder product if desired.

On the other hand, by increasing this quantity of the sulfonamide solvents one gets softer products in proportion as the quantity is increased until a product is obtained which is pliable like a fabric.

For example, if one takes to 100 kilos of cellulose acetate about 100 kilos of one of the high boiling plasticizing solvents of the present invention (or of a mixture of two or more of them) then one gets the kind of product which is pliable like a fabric, and if the plasticizing solvent is employed in quantities less than 100 per cent reckoned on the weight of the cellulose acetate, a proportionately stiffer product is obtained according as the quantity of the plasticizing solvent is reduced, whilst if the quantity of the plasticizing solvent is increased above 100 per cent calculated on the weight of the cellulose acetate, a still more pliable product is obtained.

As stated in my British patent specification No. 114,304, the higher the viscosity of the cellulose acetate the greater the quantity of the high boiling plasticizing solvent which can be used, and the less the viscosity of the cellulose acetate the smaller the quantity of the high boiling plasticizing solvent which can be used.

Colouring matters, filling materials and any other usual or suitable materials such as commonly employed in the art may of course be added in making solutions, compositions or other products according to the invention.

This application is a division of my application Serial No. 401,380, filed August 5, 1920.

What I claim and desire to secure by Letters Patent is:—

1. A composition of matter comprising cellulose acetate and a toluene dialkyl sulfonamide preparation which is liquid at ordinary temperature and forms a jelly at low temperatures.

2. A composition of matter comprising cellulose acetate and a plasticizing agent comprising a toluene dialkyl sulfonamide preparation which sulfonamid preparation is liquid at ordinary room temperature and is a jelly at temperatures somewhat below 0° C. and which is a solvent of cellulose acetate at all temperatures below the boiling point of said sulfonamide preparation.

3. A composition of matter comprising cellulose acetate and a mixture of o- and p-toluene dialkyl sulfonamides, which mixture is liquid at ordinary temperature and forms a jelly at low temperatures.

4. A composition of matter comprising cellulose acetate and a mixture of o- and p-toluene diethyl sulfonamides, which mixture is liquid at ordinary temperature and forms a jelly at low temperatures.

In testimony whereof I have hereunto subscribed my name.

HENRY DREYFUS.